July 27, 1926.
H. W. TINKER
BUMPER FOR VEHICLES
Filed April 23, 1926
1,594,135
2 Sheets-Sheet 1
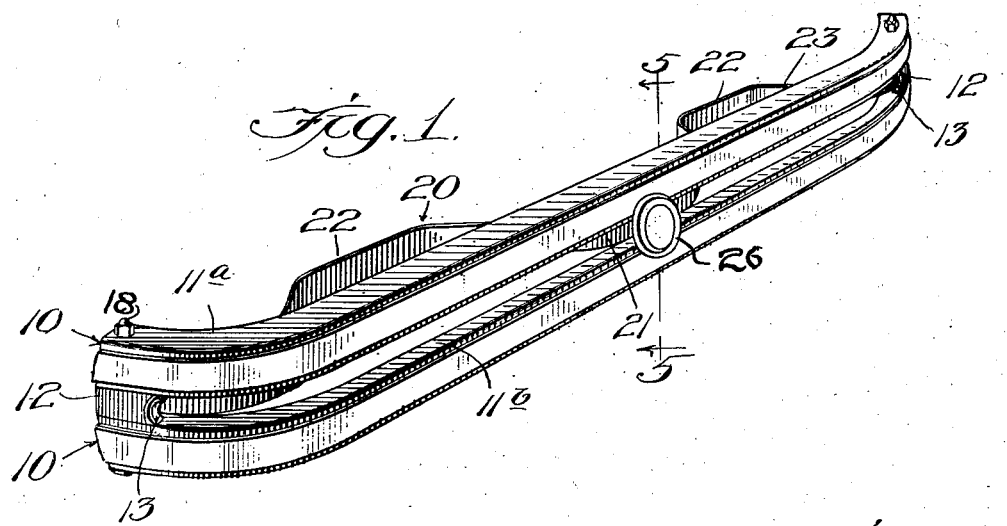
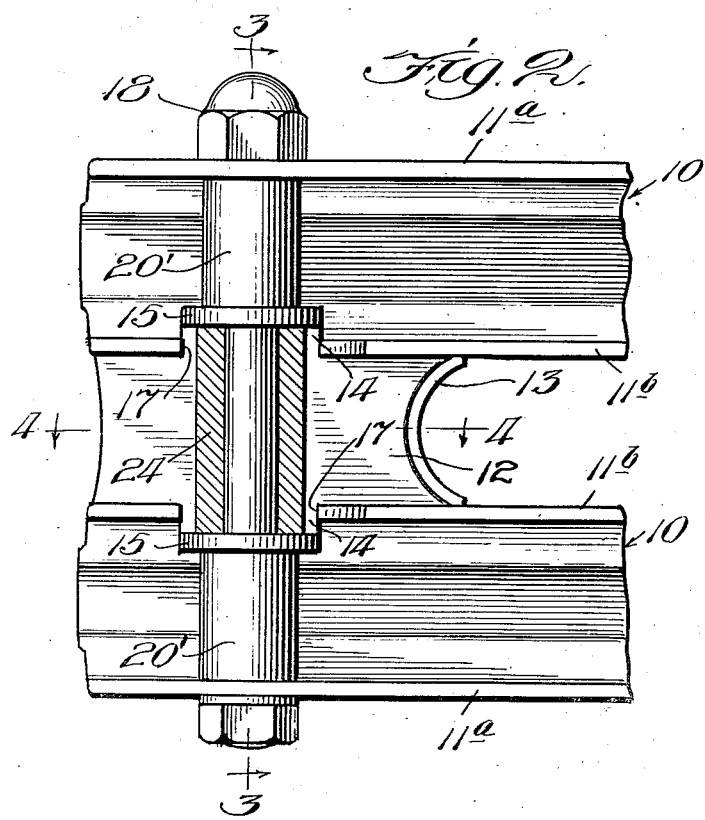
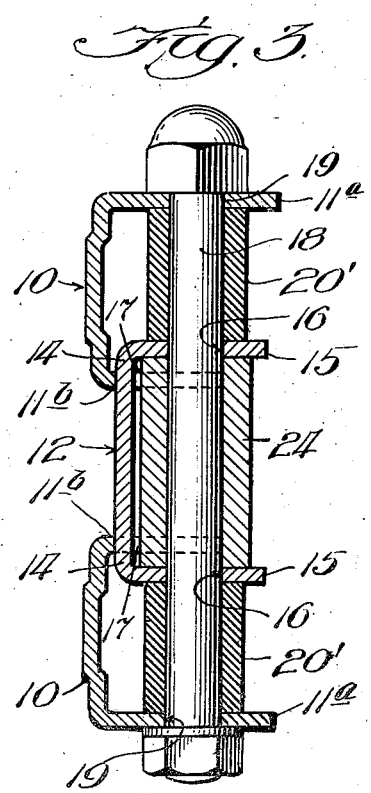

July 27, 1926.
H. W. TINKER
BUMPER FOR VEHICLES
Filed April 23, 1926
1,594,135
2 Sheets-Sheet 2
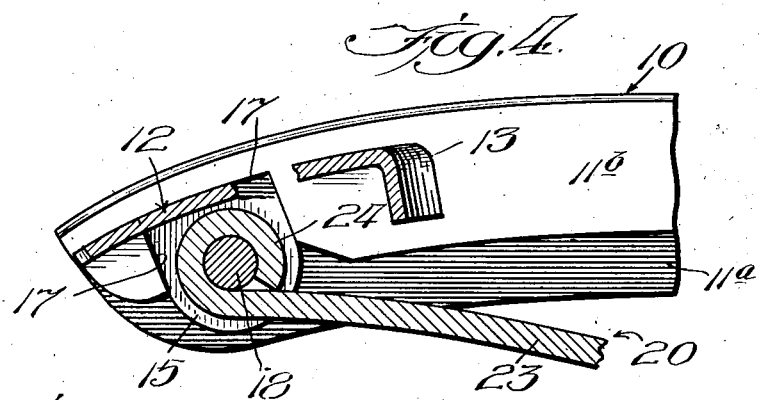
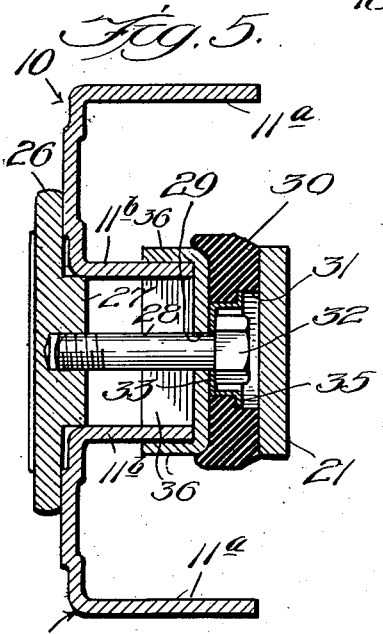
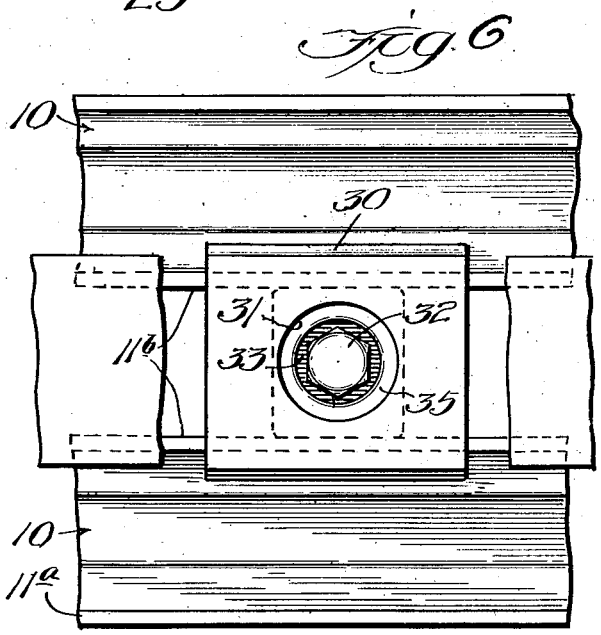
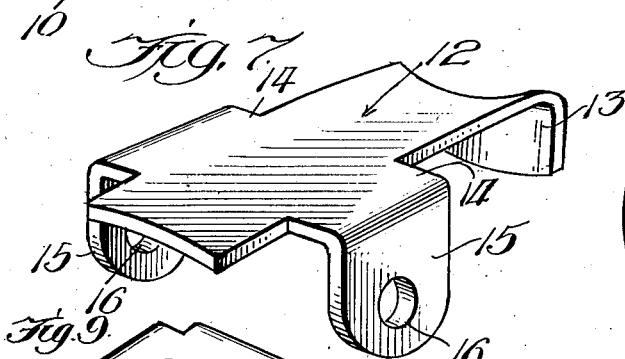
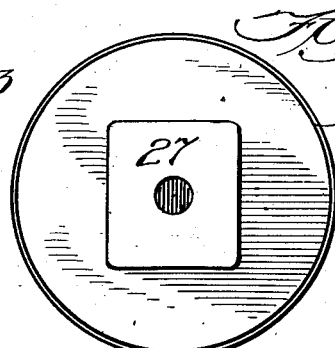
Inventor
Herbert W. Tinker
By Rector, Hibben, Davis and Macauley
Attys Patented July 27, 1926.

1,594,135

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER FOR VEHICLES.

Application filed April 23, 1926. Serial No. 104,035.

My invention relates to bumpers for vehicles and has for its general object to provide a bumper which is simple and sturdy in construction, cheap to manufacture, efficient and durable in use, and attractive in appearance.

One of the principal objects of my invention is to provide an improved form of spacing members between parallel impact bars and means for securing the impact bars, the spacing members, and the supporting bar or arms together.

Still another object of my invention is to provide improved means for securing a block formed of rubber or other flexible material in position between the impact section of the bumper and the supporting means therefor.

Other and further objects and advantages of my improved bumper will become apparent from the following description, taken in conjunction with the accompanying drawing.

In the drawings, Fig. 1 is a perspective view of a bumper embodying my invention; Fig. 2 is a rear elevation of one end of the bumper showing the eye of the supporting member in section; Fig. 3 is a transverse section taken on the line 3—3 of Fig. 2; Fig. 4 is a horizontal section taken through one end of the bumper as on the line 4—4 of Fig. 2; Fig. 5 is a transverse section taken through the center of the bumper as on the line 5—5 of Fig. 1; Fig. 6 is a fragmentary rear elevation of the central portion of the bumper with the middle of the supporting bar broken away; Fig. 7 is a perspective view of one of the spacing plates or blocks; Fig. 8 is a rear view of the device adapted to carry a trade-mark or ornamental design, and Fig. 9 is a perspective view of the central spacing block.

The impact section of my bumper comprises two parallel like impact bars 10 and spacing plates or blocks 12 between their ends. The impact bars are formed of sheet metal and are channel-shaped in cross-section, with the outer flanges 11$^a$ and narrower inner flanges 11$^b$ extending the length of the bars. Each spacing block 12 (Figs. 2, 3, 4 and 7) is formed of sheet metal and the inner vertical end of the block is provided with an inwardly extending flange 13. The spacing blocks 12 are curved longitudinally so that they are concentric with the curved ends of the impact bars 10. Projecting oppositely from the horizontal edges of each block are integral projections forming portions 14 in the plane of the block and rearwardly extending ears 15, which are provided with apertures 16. As best shown in Figs. 2 and 4, the inner flanges 11$^b$ of the impact bars are provided with recesses 17 which are substantially as wide as the portions 14 and the forward edges of the recesses are slightly curved (Fig. 4) so that the forward curved sides of the projecting portions 14 engage snugly thereagainst. The horizontal edges of the spacing blocks on either side of the portions 14 contact against the inner flanges 11$^b$ of the impact bars, as best illustrated in Fig. 2.

In order to secure these parts together, I provide bolts 18 which project through apertures 19 (Fig. 3) in the outer flanges 11$^a$ of the impact bars 10 and through the apertures 16, and spacing collars 20' are positioned between the outer flanges 11$^a$ of the impact bars and the ears 15.

The supporting bar or arms for the impact section preferably comprises a spring bar 20 (Fig. 1) formed of a flat strip of steel, this bar being formed to provide a forwardly-extending central arched section 21, intermediate straight portions 22, and curved portions 23 provided at their ends with integral eyes 24 (Figs. 2 and 4). When the bumper parts are assembled, the bolts 18 project through the eyes 24, which are positioned between the ears 15 of the respective spacing blocks 12. It will be noticed that the distance between the ears 15 of each spacing block is greater than the distance between the adjacent sides of impact bars for the purpose of accommodating the eyes 24, the supporting member also being wider than the space between the impact bars. The nuts on the lower ends of the bolts are screwed tightly on the bolts, the flanges 11$^a$ being slightly yieldable, in order that the ears 15, which are somewhat flexible, may be firmly pressed by the collars 20' against the edges of the eyes 24 to prevent all loose play and rattle between the eyes 24 and the ears 15.

It will be noted that the bolts 18 which are employed to secure the impact bars and the spacing blocks together are also employed to connect the supporting bars to the impact section, thus affording common means for performing these functions with attendant cheapness in construction and simplicity in design. As the portions 14 of the spacing blocks engage the curved edges of the recesses 17, the spacing blocks are prevented from having any rotational play or movement, and the shocks received by the impact bars when striking an obstruction are partly imparted to the spacing blocks so that the entire force or blow is not imparted to the ends of the bolts 18 through the outer flanges 11ª of the impact bars. The impact bars are held snugly against the horizontal edges of the spacing blocks so that when the impact section of the bumper is viewed from the front it gives the appearance of an impact section having the two impact bars and the spacing blocks formed of a single piece of sheet metal.

At the center of the impact bars, I provide a plate or disk 26 (Figs. 5 and 8) to the front face of which a trade-mark or suitable artistic design or insignia may be applied. The rear side of the disk 26 has a square portion 27 which is adapted to fit snugly between the central portions of the impact bars. The disk 26 is held in position by means of a screw 28 which projects through a block 29 and at its forward end is screw threaded into an opening in the disk. The block 29 is preferably formed of sheet metal cut and bent to provide forwardly extending vertical and horizontal flanges 36 and slots 37 at the corners. The vertical width of the slots 37 is substantially the same as the thickness of the flanges 11ᵇ which fit snugly therein. The back plate of the block 29 rests against the rear edges of the inner flanges 11ᵇ of the impact bars and carries a rubber block 30 having a central opening 31 to accommodate the head 32 of the screw 28. As the flanges 11ᵇ fit snugly in the slots 37 it will be seen that the vertical and horizontal flanges 36 space the impact bars apart and prevent any vibration between them. In order to firmly hold the block 30 in position, I provide a cup or thimble-shaped member 33 which is held in place against the plate 29 by the head 32 of the screw 28 and which is provided with an outwardly-extending flange 35 engaging against an annular shoulder formed in the central opening of the rubber block. This affords a simple and cheap means for securing the block 30 in position and at the same time the screw secures the plate 29 and the member 33 in fixed relation. As shown in Fig. 5, the center of the arch 21 of the spring supporting bar contacts with the rear side of the rubber block to eliminate rattle and undue vibration and at the same time strengthens the middle of the impact section.

I claim:—

1. In a vehicle bumper, the combination of two impact bars spaced apart, a spacing block between said bars and having projecting portions engaging the rear sides of said bars, a supporting member, and a single device for securing the impact bars, spacing block and supporting member together.

2. In a vehicle bumper, the combination of two impact bars spaced apart, a spacing block between said bars at each end thereof and having rearwardly extending flanges, a supporting member having a portion positioned between said flanges, and a bolt at each end projecting through said flanges and securing said impact bars and spacing block together.

3. In a vehicle bumper, the combination of two impact bars spaced apart and having rearwardly extending flanges, spacing blocks between said impact bars, and having rearwardly extending flanges, supporting arms having openings, and bolts extending through the flanges on said impact bars and spacing blocks and the openings in said supporting arms.

4. In a vehicle bumper, the combination of two impact bars having apertures, an apertured spacing block between said impact bars, a supporting arm having an eye positioned within said spacing block, and a bolt projecting through the apertures in said impact bars and spacing block and through said eye to secure said bars, block and arm together.

5. In a vehicle bumper, the combination of two channel-shaped impact bars spaced apart, a spacing block positioned between the inner flanges of said impact bars, portions of said spacing block projecting through the inner flanges of said impact bars, and a bolt projecting through openings in said spacing block and outer flanges of said impact bars to secure the spacing block and bars together.

6. In a vehicle bumper, the combination of two channel-shaped impact bars spaced apart, a spacing block between said impact bars and engaged by adjacent sides of said impact bars and having portions projecting through recesses in the inner flanges of said impact bars, rearwardly extending ears on said spacing block and securing means projecting through apertures in the outer flanges of said impact bars and said ears.

7. In a vehicle bumper, the combination of two channel-shaped impact bars spaced apart, a spacing block between said impact bars and engaged by adjacent sides of said impact bars and having portions projecting through recesses in the inner flanges of said impact bars, rearwardly extending ears on said spacing block, and a supporting arm having a portion positioned between said ears.

8. In a vehicle bumper, the combination of two channel-shaped impact bars spaced apart, a spacing block between said impact bars and engaged by adjacent sides of said impact bars and having portions projecting through recesses in the inner flanges of said impact bars, rearwardly extending ears on said spacing block, a supporting bar having an apertured portion between said ears, and a bolt projecting through apertures in the outer flanges of said impact bars, the ears and arm for securing the parts together.

9. In a vehicle bumper, the combination of two channel-shaped impact bars, spaced apart, a spacing block between said impact bars and having portions projecting through recesses in the inner flanges of said impact bars, apertured ears projecting rearwardly from the outer ends of said portions, a spring supporting bar having an apertured end fitting closely between said bars, and a bolt projecting through apertures in said ears and end of the supporting bar.

10. In a vehicle bumper, the combination of two channel-shaped impact bars, spaced apart, a spacing block between said impact bars and having portions projecting through recesses in the inner flanges of said impact bars, apertured ears projecting rearwardly from the outer ends of said portions, a spring supporting bar having an apertured end fitting closely between said bars, and a bolt projecting through apertures in said ears and end of the supporting bar and in the outer flanges of the impact bars.

11. In a vehicle bumper, the combination of two channel-shaped impact bars spaced apart, a spacing block between said impact bars and having portions projecting through recesses in the inner flanges of said impact bars, apertured ears projecting rearwardly from the outer ends of said portions, a flat spring bar having an integral eye having its ends engaged by said ears, a bolt projecting through apertures in said ears and the outer flanges of said impact bars and through said eye to secure the parts together and pivot the end of said supporting bar, and spacing collars around said bolt and between said outer flanges and said ears.

12. In a vehicle bumper, the combination of two channel-shaped impact bars spaced apart, a sheet metal spacing block positioned between the inner flanges of said impact bars, a rearwardly extending flange at the inner vertical edge of said block, portions on said spacing block projecting through the inner flanges of said impact bars, and a bolt projecting through openings in said spacing block and outer flanges of said impact bars to secure the spacing block and bars together.

13. In a vehicle bumper, the combination of two channel-shaped impact bars spaced apart, spacing members between the ends of the impact bars at each end of the bumper, each spacing member having its horizontal edges engaging the inner flanges on the impact bars, integral portions on each spacing member projecting through recesses in said inner flanges, rearwardly extending ears on the ends of said portions, a spring supporting bar having integral eyes at its ends, and bolts projecting through apertures in the ears and outer flanges of said impact bars and through said eyes.

14. In a vehicle bumper, the combination of two channel-shaped impact bars spaced apart, spacing members between the ends of the impact bars at each end of the bumper, each spacing member having its horizontal edges engaging the inner flanges on the impact bars, integral portions on each spacing member projecting through recesses in said inner flanges, rearwardly extending ears on the ends of said portions, a spring supporting bar having integral eyes at its ends, bolts projecting through apertures in the ears and outer flanges of said impact bars and through said eyes, and collars around said bolts and between said outer flanges and ears adapted to press the latter against the ends of said eyes.

15. In a vehicle bumper, the combination of two rigid impact bars each having a rearwardly extending flange at its outer edge, spacing blocks having portions the front sides of which are engaged by said impact bars, rearwardly extending ears on said portions, and a spring retaining bar wider than the space between said impact bars and having eyes at its ends positioned between said ears, and bolts projecting through said flanges, ears and eyes.

16. In a vehicle bumper, the combination of an impact section, a supporting section, a holder on one of said sections, means for securing the holder in place, a resilient block carried by said holder and having an opening therethrough to accommodate said securing means, and a device held in place by said securing means and having a projecting portion for fastening the resilient block in place.

17. In a vehicle bumper, the combination of an impact section, a supporting section, a resilient block carried by one of said sections and having an opening therethrough with an annular shoulder, a cup-shaped member in said opening and having a flange engaging said annular shoulder, and means for securing said cup-shaped member to said last-mentioned section.

18. In a vehicle bumper, the combination of two impact bars having rearwardly projecting flanges, and a spacing block having vertical and horizontal flanges with slots at the corners for snugly receiving said flanges.

19. In a vehicle bumper, the combination of two channel-shaped impact bars, means connecting the ends of said bars, and a central spacing block having slots into which the inner flanges of said bars snugly fit.

20. In a vehicle bumper, the combination of two spaced apart parallel impact bars having inwardly extending flanges at their adjacent edges, spring supporting arms connected to the ends of said bars, and a spacing block mounted centrally on said bars and having horizontally bent flanges engaging the outer sides of said first mentioned flanges and also having vertically bent flanges, the ends of which engage the adjacent sides of said first mentioned flanges.

21. In a vehicle bumper, the combination of two spaced apart channel-shaped impact bars, a spacing block formed of sheet metal and having inwardly extending flanges around its horizontal and vertical edges with slots at the corners for accommodating the inner flanges on the impact bars, and a resilient block secured against the back of said spacing block and having ribs engaging over the edges of the spacing block.

In testimony whereof, I have subscribed my name.

HERBERT W. TINKER.